(12) United States Patent
Lopez

(10) Patent No.: US 10,127,604 B2
(45) Date of Patent: Nov. 13, 2018

(54) IDENTIFICATION AND CALLER OPTIONS RELATING TO CUSTOM RINGBACK AUDIO

(71) Applicant: Verizon Patent and Licensing Inc., Arlington, VA (US)

(72) Inventor: Antonia J. Lopez, San Bruno, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 14/470,567

(22) Filed: Aug. 27, 2014

(65) Prior Publication Data

US 2016/0063612 A1 Mar. 3, 2016

(51) Int. Cl.
*G06Q 30/06* (2012.01)
*H04M 3/42* (2006.01)
*G06Q 10/02* (2012.01)
*H04W 4/16* (2009.01)

(52) U.S. Cl.
CPC ......... *G06Q 30/0641* (2013.01); *G06Q 10/02* (2013.01); *H04M 3/42017* (2013.01); *H04M 3/42178* (2013.01); *H04W 4/16* (2013.01)

(58) Field of Classification Search
CPC ......... H04M 3/42017; H04M 1/72558; H04M 3/4285; H04W 4/16
See application file for complete search history.

(56) References Cited

U.S. PATENT DOCUMENTS

| | | | |
|---|---|---|---|
| 7,613,287 B1* | 11/2009 | Stifelman et al. | ....... 379/215.01 |
| 7,995,728 B1* | 8/2011 | Martin | .............. H04M 3/42017 379/201.02 |
| 8,705,721 B2* | 4/2014 | Raju | .................. H04M 3/42102 379/210.02 |
| 8,774,385 B2* | 7/2014 | Siddiqui | ........... H04M 3/42017 379/207.16 |
| 8,953,769 B2* | 2/2015 | Jacobson | ............... H04M 15/00 379/207.16 |
| 2006/0023862 A1* | 2/2006 | Sutcliffe | ........... H04M 3/42017 379/257 |
| 2006/0026277 A1* | 2/2006 | Sutcliffe | ................. H04M 1/57 709/224 |
| 2007/0121821 A1* | 5/2007 | Su | ..................... H04M 3/42017 379/88.13 |
| 2007/0173236 A1* | 7/2007 | Vishwanathan et al. | .. 455/414.1 |
| 2009/0003550 A1* | 1/2009 | Mani | .................. H04M 3/42017 379/88.19 |
| 2009/0285379 A1* | 11/2009 | Jeon | ................... H04M 3/42017 379/207.16 |
| 2010/0014647 A1* | 1/2010 | Subramaniam | ... H04M 3/42017 379/87 |
| 2011/0092191 A1* | 4/2011 | Inapakolla | .............. H04M 3/42 455/414.1 |

(Continued)

FOREIGN PATENT DOCUMENTS

WO   WO2013191755   * 12/2013   ............ H04W 88/02

*Primary Examiner* — Patrick Edouard
*Assistant Examiner* — Eboni Hughes

(57) ABSTRACT

Custom ringback audio, and metadata associated with the ringback audio, may be transmitted to a caller device. The caller device may playback the custom ringback audio during a ringback portion the call and may provide, via a graphical call interface, information based on the received metadata. The information may include, for example, a title of a song corresponding to the custom ringback audio.

17 Claims, 9 Drawing Sheets

(56) References Cited

U.S. PATENT DOCUMENTS

| | | | |
|---|---|---|---|
| 2011/0312305 A1* | 12/2011 | Jajodia | H04M 3/42017 455/414.1 |
| 2012/0076289 A1* | 3/2012 | Mutya | H04M 3/42017 379/207.16 |
| 2013/0185151 A1* | 7/2013 | Mogalapalli | G06Q 30/02 705/14.49 |
| 2013/0279684 A1* | 10/2013 | Gregorek | H04M 7/129 379/257 |
| 2014/0066033 A1* | 3/2014 | Lee | H04M 3/42017 455/414.1 |
| 2014/0201675 A1* | 7/2014 | Joo | G06F 3/0481 715/784 |
| 2015/0350448 A1* | 12/2015 | Coffman | H04M 3/42263 379/212.01 |

\* cited by examiner

| Audio ID | Artist | Title | Album | Purchase Info | Ticket |
|---|---|---|---|---|---|
| <audio_sample_1_link> | a_singer | Happy Birthday to Me | First Album | <purchase_link> | <ticket_vendor_link> |
| <audio_sample_2_link> | a_band | Rumour | Blue | | |
| ... | ... | ... | ... | ... | ... |

Fig. 4

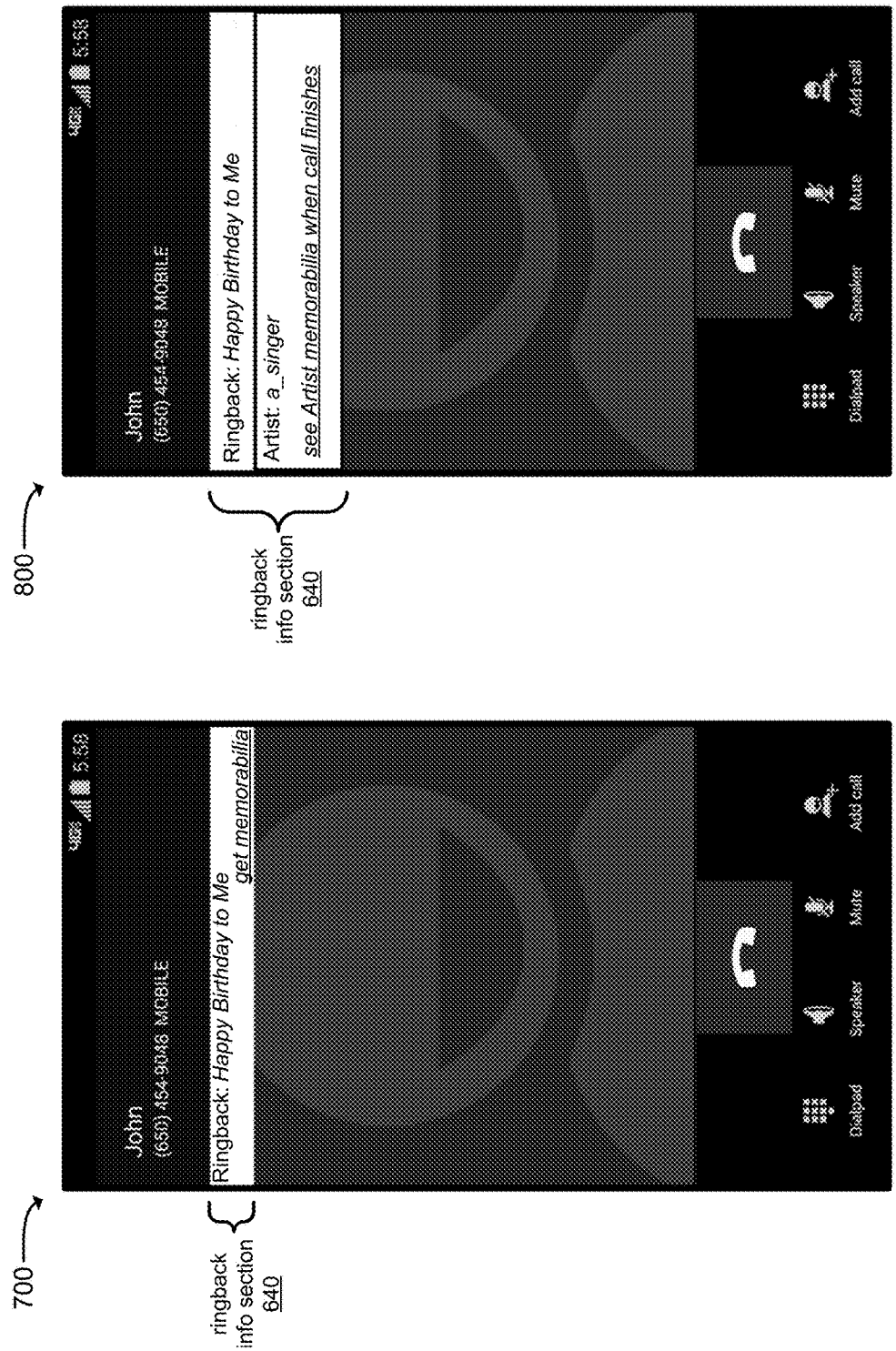

IDENTIFICATION AND CALLER OPTIONS RELATING TO CUSTOM RINGBACK AUDIO

BACKGROUND

A ringback tone is an audible indication that is heard on the telephone by a caller while the destination device (the callee) is being rung. Standard ringback tones are relatively simple sounds, such as a tone, that are repeated to the caller. Ringback tones are designed to assure the caller that the line of the callee is ringing.

Some telephone service providers allow subscribers to define custom ringback audio. The custom ringback audio may include, for example, a portion of a song. Further, telephone service provides may allow the subscriber to choose different custom ringback audio for different callers. For example, a subscriber may specify a group of callers, such as those corresponding to the subscriber's family, that should hear custom ringback audio, while all other callers may hear the standard ringback tone.

BRIEF DESCRIPTION OF THE DRAWINGS

FIG. 4 is a diagram illustrating an example data structure that may be maintained by the ringback server of FIG. 2;

FIGS. 6A, 6B, and 7-10 are diagrams illustrating example call interfaces that may be displayed to a caller that is provided with custom ringback audio.

DETAILED DESCRIPTION OF PREFERRED EMBODIMENTS

The following detailed description refers to the accompanying drawings. The same reference numbers in different drawings may identify the same or similar elements.

Techniques described herein may provide information relating to custom ringback audio that is being played to a caller. The information may include, for example, when the ringback audio is a song, information such as an artist associated with the song, the title of the song, an option to purchase the song, an option to purchase memorabilia relating to the artist, or other information. In one implementation, the information may be provided as a part of the normal call interface associated with a smartphone or tablet device. For example, a smartphone user that places a call that results in ringback audio being played to the user, may continue to see, via the display of the smartphone, normal graphical options that are provided during a call, such as a numeric keypad, an option to mute the call, an option to place the call in "speaker" mode, etc. The smartphone user may also be provided with the information relating to the custom ringback audio, such as by providing the information via a relatively unobtrusive manner.

As used herein, the term "caller" may refer to a user placing a call and/or the communication device of the user placing the call. Similarly, the term "callee" may refer to a user receiving the call and/or the communication device of the user receiving the call.

Figure 1:
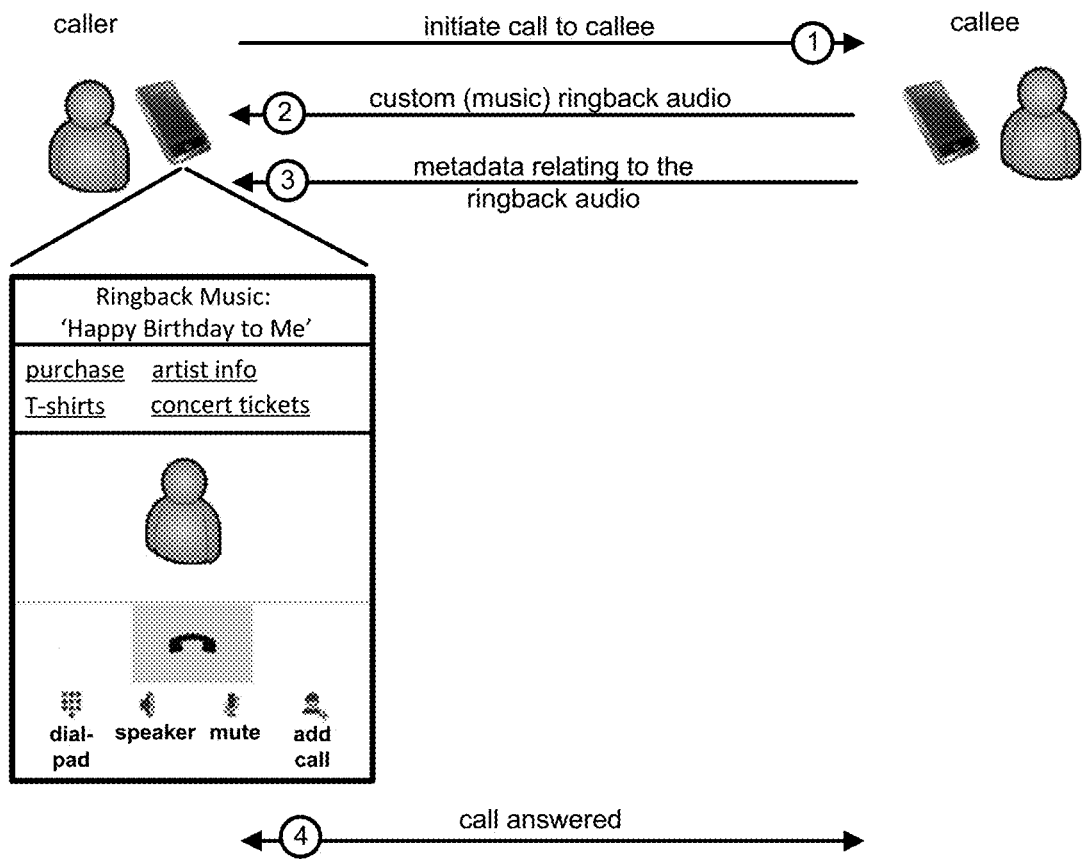
FIG. 1 is diagram illustrating an example of an overview of concepts described herein.

FIG. 1 is diagram illustrating an example of an overview of concepts described herein. As illustrated, assume that a caller (e.g., a user associated with a communication device such as a smartphone) wishes to place a call to a callee. The callee may have specified customer ringback audio, such as music, that is to be played to the caller while the caller waits for the callee to answer the call. The caller may initiate the call, such as by dialing a telephone number associated with a communication device of the callee (e.g., a smartphone or other communication device) (at 1, "initiate call to callee"). While the call is ringing at the communication device of the callee, the caller may receive the custom audio that was specified by the callee (at 2, "custom (music) ringback audio"). Additionally, the communication device of the caller may receive metadata relating to the music that is provided in the ringback audio (at 3, "metadata relating to the ringback audio").

The communication device of the caller may receive the metadata and may use the metadata to provide information, relating to the ringback audio, to the caller. As illustrated in FIG. 1, an interface provided the communication device of the caller may display information such as the name of the ringback audio (the song "Happy Birthday to Me"). In some implementations, and when applicable, additional information or options, relating to the ringback audio, may also be displayed, such as: a link or option to purchase the song ("purchase"), a link for additional information relating to the song and/or artist ("artist info"), a link or option to purchase memorabilia associated with the song and/or artist ("T-shirts"), a link or option to purchase tickets to a live performance of the artist associated with the song ("concert tickets"), and/or other information. Selecting one of the links may provide the caller with additional information relating to the link.

The call interface, provided by the communication device of the caller, may continue to provide a standard call interface, such as one including a picture of the callee and providing options relating to viewing the dialpad, placing the call in speaker mode, muting the call, and adding the callee to a contact list. The information relating to the custom ringback audio may be provided in a relatively unobtrusive manner.

At some point, the callee may answer the call (at 4, "call answered"). At this point, the information relating to the custom ringback audio may continue to be displayed to the caller, may be modified to take up less screen space, or may be completely removed from the call interface.

Figure 2:
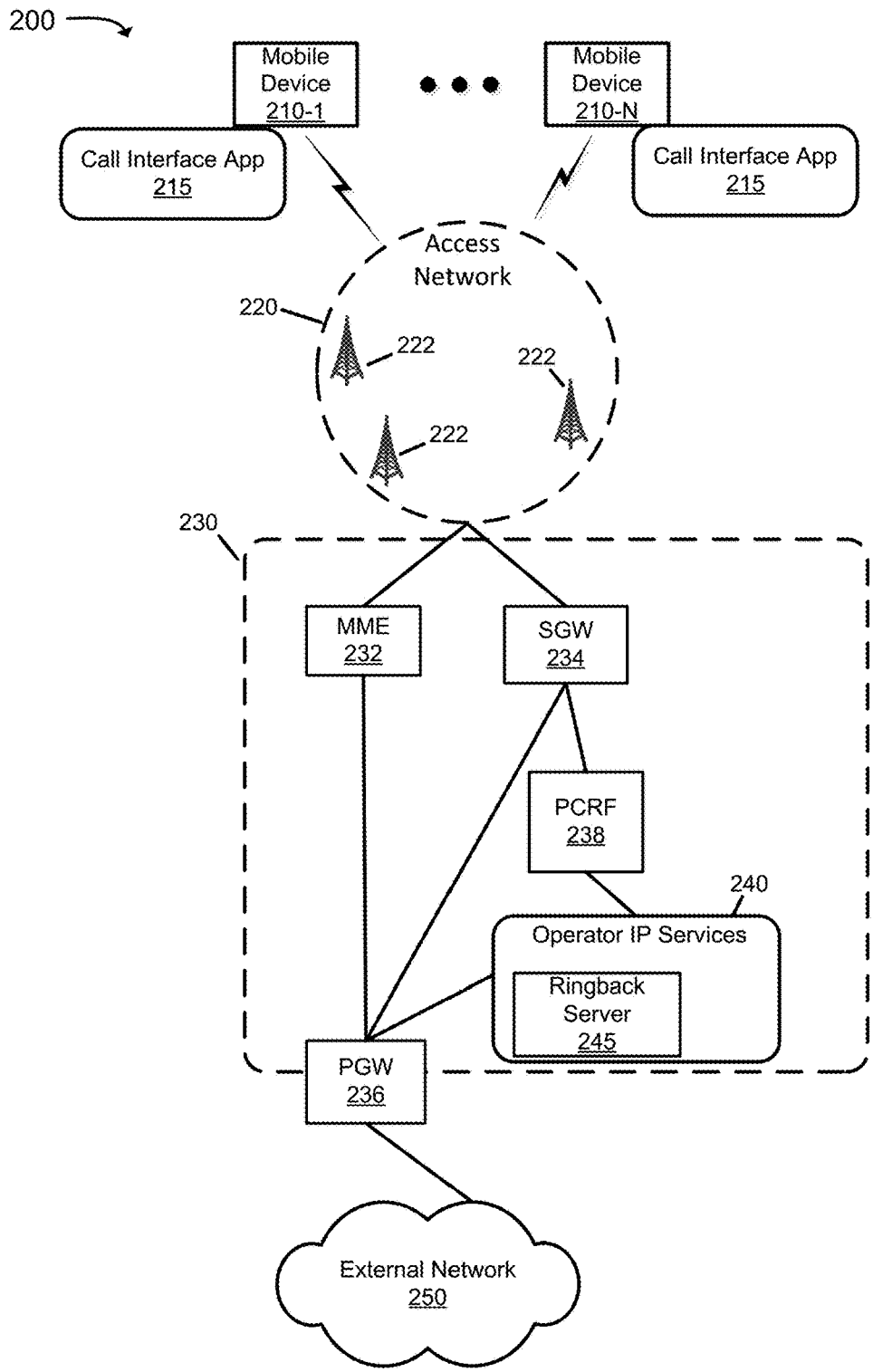
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more mobile devices 210-1 through 210-N (where N is an integer greater than or equal to one, hereinafter sometimes referred to individually as "mobile device 210" and collectively as "mobile devices 210"), access network 220, core network 230, and external network 250. Access network 220 and core network 230 may together represent a wireless network, such as a cellular wireless network. Access network 220 may be associated with a network operator that controls or otherwise manages core network 230. In one implementation, core network 230 may include an Internet Protocol (IP)-based network, such as System Architecture Evolution (SAE) core network or a General Packet Radio Service (GPRS) core network.

Mobile device 210 may include a portable computing and communication device that can place voice calls via a telecommunications network, such as access network 220 and core network 230. Mobile device 210 may be, for example, a personal digital assistant (PDA), a smartphone, a cellular phone, a laptop computer with connectivity to a cellular wireless network, a tablet computer, etc.

Mobile device 210 may place/receive voice calls (and/or video calls) using IP based voice technologies, such as Voice-over-Internet Protocol (VoIP) technologies. When placing and receiving a voice call, mobile device 210 may present a graphical call interface (e.g., on a display of mobile device 210) to the user of mobile device 210. The graphical call interface may be presented using call interface application ("app") 215, which may include an application that is installed by a user and/or installed during manufacture or provisioning of mobile device 210. In some implementations, call interface application 215 may include a "standard" call interface application (e.g., an application to present a basic call interface for mobile device 210, such as one included as part of the operating system of mobile device 210) and a supplemental application, such as one installed by the user of mobile device 210, to provide additional information and/or control options relating to a call.

Access network 220 may represent a wireless access network, such as a 3rd Generation Partnership Project (3GPP) Long Term Evolution (LTE) access network, that includes one or more access technologies. Access network 220 may include base stations 222. In the context of an LTE-based access network, base stations 222 may be referred to as evolved NodeBs (eNodeBs). Base stations 222 may each provide a radio interface over which the eNodeB may communicate with mobile device 210. The radio interface may include a radio interface that implements, for example, an Evolved Terrestrial Radio Access Network (E-UTRAN).

Core network 230 may include mobility management entity (MME) 232, serving gateway (SGW) 234, packet data network gateway (PGW) 236, policy charging and rules function (PCRF) 238, and operator IP services 240. In some implementations, various ones of the elements illustrated in core network 230, such as MME 232 and SGW 234, may alternatively be implemented as part of or considered to be part of access network 220.

MME 232 may include one or more computation and communication devices that perform operations to register mobile device 210 with core network 230, establish bearer channels associated with a session with mobile device 210, hand off mobile device 210 from one base station to another, implement network traffic policies, and/or perform other operations. MME 232 may generally handle control plane traffic. SGW 234 may include one or more network devices that aggregate traffic received from one or more base stations 222. SGW 234 may generally handle user (data) plane traffic.

PGW 236 may include one or more devices that act as the point of interconnect between core network 230 and external network 250 and/or operator IP services 240. PGW 236 may route packets to and from the access network 220 and external network 250. PCRF 238 may operate in real-time to determine policy rules for the network. PCRF 238 may aggregate information to and from core network 230, operational support systems, and other sources. PCRF 238 may support the creation of rules and policy decisions for active subscribers. The rules and policy decisions may include communication restriction policies that relate to restricting certain communications.

Operator IP services 240 may represent one or more services that are offered by the operator of core network 230. The services may include IP multimedia (IMS)-based services, transparent end-to-end packet-switched streaming services (PSSs), or other services. Operator IP services 240 may implement application servers to provide added functionality to mobile devices associated with core network 230. Operator IP services 240 may particularly include services related to custom ringback audio, illustrated as being implemented by ringback server 245.

Ringback server 245 may include one or more computing devices or processes that implement custom ringback audio services. Ringback server 245 may maintain a database (or other data structure) that correlates subscribers to ringback tones or music that are selected by the subscribers. For instance, a subscriber, associated with a mobile device 210, may indicate that callees, when calling the subscriber, should hear a specified audio tone or music portion during the ringback portion of the call. In some implementations, subscribers may be allowed to upload arbitrary audio for the ringback audio. In other implementations, subscribers may be limited to choosing from a preselected set of ringback audio sounds/music. In some implementations, subscribers may assign custom ringback audio on a per-callee basis (a subscriber may designate that different callees will hear different ringback audio). In operation, ringback server 245 may generally function to determine whether a particular callee/caller combination is enabled for custom ringback audio and, when the callee/caller combination is enabled for the custom ringback audio, controlling the transmission of the custom ringback audio to the caller.

Although ringback server 245, in FIG. 2, is illustrated as being part of operator IP services 240, in some implementations, some or all of the functionality limited by ringback server 245 may be implemented by different devices and/or by different portions of access network 220 and/or core network 220. For example, ringback server 245, as implemented as part of operator IP services 240, may be called during initial setup and control signaling for a call. The actual substantive custom audio for the ringback portion of the call may be streamed from another network device, such as a network device associated with core network 230 and/or an output device associated with external network 250.

External network 250 may include an IP-based network or other network. For example, external network may include a local area network (LAN), a wide area network (WAN), a metropolitan network (MAN), an intranet, the Internet, a fiber optic-based network, and/or a combination of these or other types of networks.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
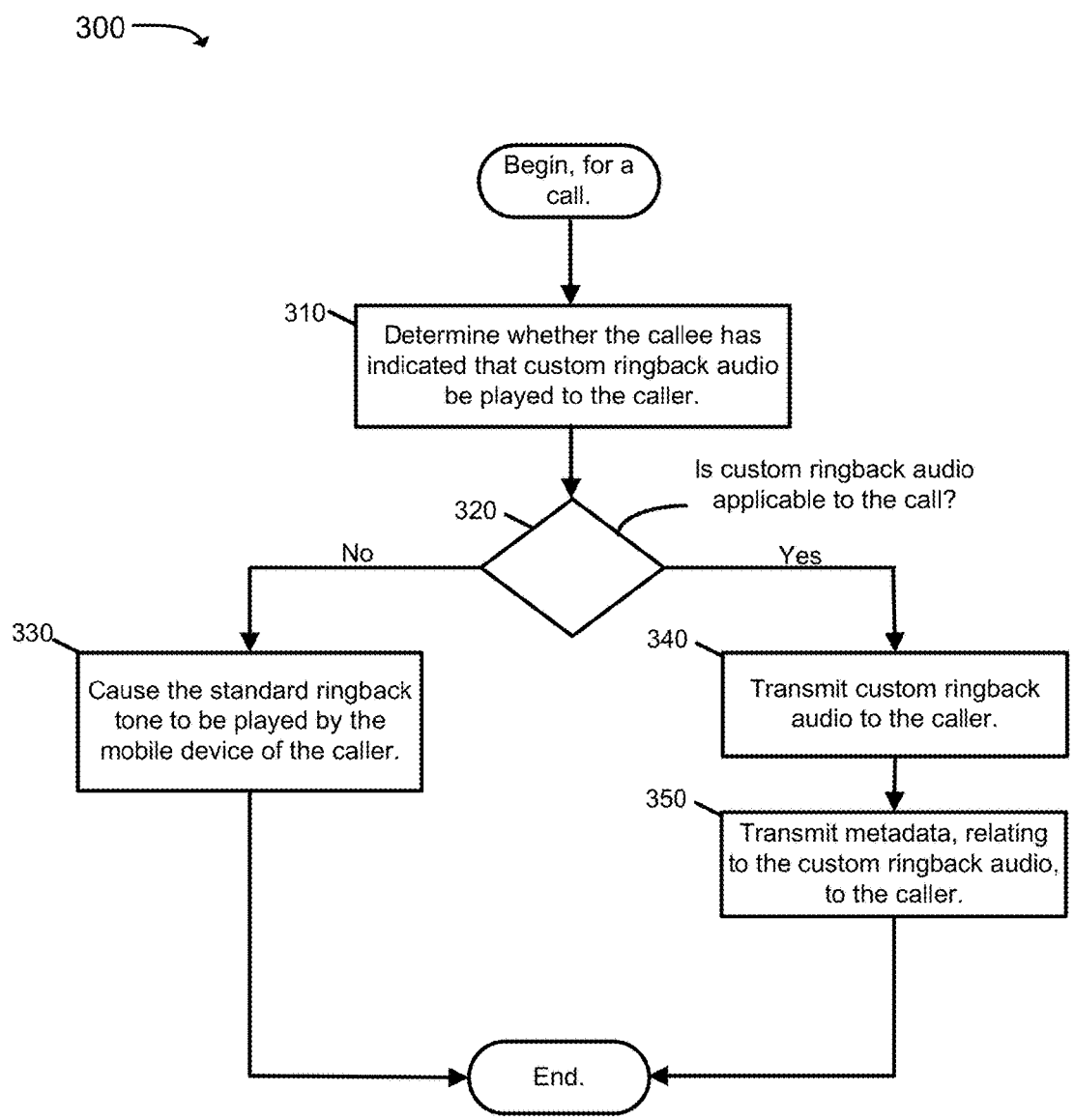
FIG. 3 is a flow chart illustrating an example of a process relating to providing custom ringback audio to a caller.

FIG. 3 is a flow chart illustrating an example of a process relating to providing custom ringback audio to a caller. Process 300 may be performed by, for example, ringback server 245. Process 300 may be performed in response to a call, such as a VoIP voice call, from a caller to a callee.

Process 300 may include determining whether the callee has indicated that custom ringback audio be played to the caller (block 310). As previously mentioned, a communications provider may enable subscribers to select custom ringback audio that is to be played to callers that call the subscriber. In one implementation, during the initial call signaling and setup, ringback server 245 may determine whether custom ringback audio is associated with call. For example, ringback server 245 may maintain a database or data structure that indicates which mobile devices 210 are subscribed for custom ringback audio. In some implementations, the database may include, for the subscribed mobile devices 210, which callers (e.g., which telephone numbers) are associated with custom ringback audio.

Process 300 may further include, when custom ringback audio is not applicable to the call (block 320—No), causing the standard ringback tone to be played by the mobile device of the caller (block 330). For example, ringback server 245 may transmit the standard ringback tone to the mobile device of the caller. Alternatively, instead of transmitting the substantive data corresponding to the ringback tone, control signaling may be transmitted to the mobile device of the caller to indicate that the mobile device should begin playing the standard ringback tone.

Process 300 may further include, when custom ringback audio is applicable to the call (block 320—Yes), transmitting the custom ringback audio to the caller (block 340). In this manner, the caller may receive the custom ringback audio (e.g., a musical piece) and begin to play the custom ringback audio in place of the standard ringback tone. In some implementations, the custom ringback audio may be transmitted from ringback server 245. Alternatively or additionally, the custom ringback audio may be transmitted by another network device, such as a content server connected to core network 230 or external network 250. In this situation, ringback server 245 may, for example, control the content server to stream the custom ringback audio to the caller.

Process 300 may further include transmitting metadata, relating to the custom ringback audio, to the caller (block 350). The metadata may include data about the audio. For example, the metadata may include the artist associated with a musical piece (e.g., a song), the title of the musical piece, a link to purchase the musical piece, a link to purchase memorabilia relating to the artist, a link to purchase other concert tickets for the artist or for similar artists, or other data. In one implementation, the metadata may be transmitted to the caller by ringback server 245. In some implementations, the caller device may be a standard telephone that may not be not capable of displaying additional information relating to the custom ringback audio. In this case, the metadata may not be transmitted.

FIG. 4 is a diagram illustrating an example data structure 400, such as a data structure that may be maintained by ringback server 245. Data structure 400 may be used to store the metadata relating to audio for the ringback audio, such as the metadata transmitted in block 350 of FIG. 3.

As illustrated, data structure 400 may include a number of fields, including: audio identifier ("ID") field 410, artist field 420, title field 430, album field 440, purchase information "info" field 450, and ticket field 460. The fields shown for data structure 400 are examples. In alternative possible implementations, different, fewer, or additional fields may be implemented.

Audio identifier field 410 may include information identifying a particular song, portion of a song, or other audio segment that is used as ringback audio. Audio identifier field 410 may include, for example, a link to the audio, such as a file name, resource identifier, or other link. Audio identifier field 410 may thus serve as an identifier that can be used to obtain the substantive audio data.

Artist field 420, title field 430, and album field 440 may describe the audio identified in the corresponding audio identifier field 410. Artist field 420 may identify the artist that performed/recorded the audio (e.g., a song), title field 430 identify the title of the audio (e.g., the title of the song), and album field 440 may identify the name of the album on which a song was published.

Purchase information field 450 may include information relating to how the corresponding audio can be purchased. Purchase information field 450 may include, for example, links to online stores, pricing information for the audio, and/or other information that can be used to facilitate purchasing of the corresponding audio. Similarly, ticket field 460 may include information relating to the upcoming performances relating to the audio, such as upcoming live performances, near the location of the caller, by the artist (or by similar artists) corresponding to the audio.

Two example records are illustrated in data structure 400, which may correspond to two custom ringback audio samples, such as two songs or portions of songs. The first record illustrated in data structure 400 is for the song "Happy Birthday to Me" (title field 430) by the artist "a_singer" (artist field 420) and associated with the album "First Album" (album field 440). The song may be uniquely identified in audio identifier field 410 ("audio_sample_1_link"). The identifier in audio identifier field 410 may include, for example, a link to the corresponding audio file, such as a uniform resource identifier (URI), a uniform resource locator (URL), or another type of link. The substantive audio file may be stored at ringback server 245 or at another network device. Purchase information field 450 may include information relating to purchasing of the song ("purchase_link"). Purchase information field 450 may include, for example, price information for the song, a link to one or more sellers of the song, etc. Ticket field 460 may include information ("ticket_vendor_link") relating to the purchase of tickets for live performances of the artist identified in artist field 420 or of artists similar to the artist. The information in ticket field 460 may generally be used to offer the caller an option to conveniently purchase tickets for the artist. Ticket field 460 may include, for example, a link to a ticket vendor, performance dates/times, ticket pricing information, or other information.

The second record illustrated in data structure 400 is for the song "Rumour" (title field 430) by the artist "a_band" (artist field 420) and associated with the album "Blue" (album field 440). The song may be uniquely identified in audio identifier field 410 ("audio_sample_2_link"). For this song, purchase information field 450 and ticket field 460 may be blank, indicating that there may not be an option to purchase this song or to buy live performance tickets for this song.

Figure 5:
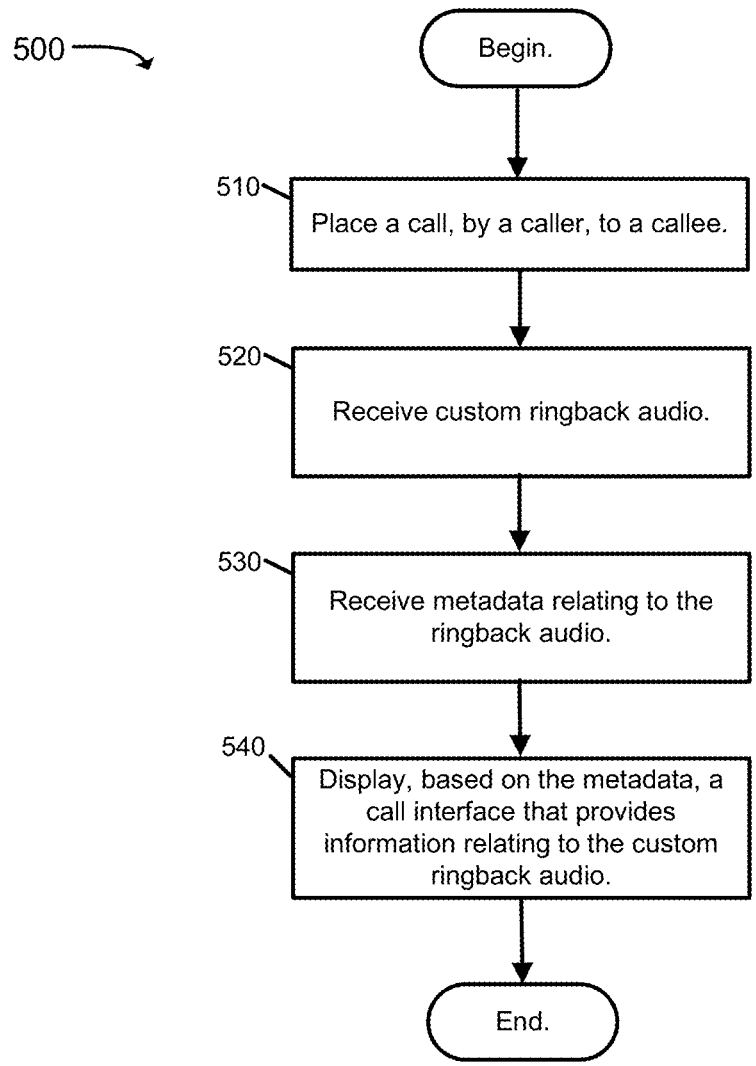
FIG. 5 is a flow chart illustrating an example of a process relating to providing custom ringback audio to a caller.

FIG. 5 is a flow chart illustrating an example of a process relating to providing custom ringback audio to a caller. Process 500 may be performed by, for example, mobile device 210 of a caller (e.g., by call interface application 215 of mobile device 210).

Process 500 may include placing a call, by a caller, to a callee (block 510). The call may be a call to a callee that has enabled custom ringback audio. The custom ringback audio may be received by the caller (block 520). The metadata, relating to the ringback audio, may also be received (block 530). The custom ringback audio and the metadata may be transmitted to the caller based on the application of process 300 (FIG. 3).

Process 500 may further include displaying, based on the metadata, a call interface, to the caller, that provides information relating to the custom ringback audio (block 540). The call interface may be similar to a standard call interface (e.g., a graphical display that includes information relating to the callee, the time duration of the call, and/or commands relating to the call) but may also provide information about the custom ringback audio. A caller that likes the ringback audio may thus be given an opportunity to view information relating to the ringback audio and to potentially purchase the corresponding song (or other products relating to the song).

FIGS. 6A, 6B, and 7-10 are diagrams illustrating example call interfaces that may be displayed to a caller that is provided with custom ringback audio. The call interfaces of FIGS. 6A, 6B, and 7-10 may include graphical interfaces provided by mobile device 210 during the call.

Figure 6B:
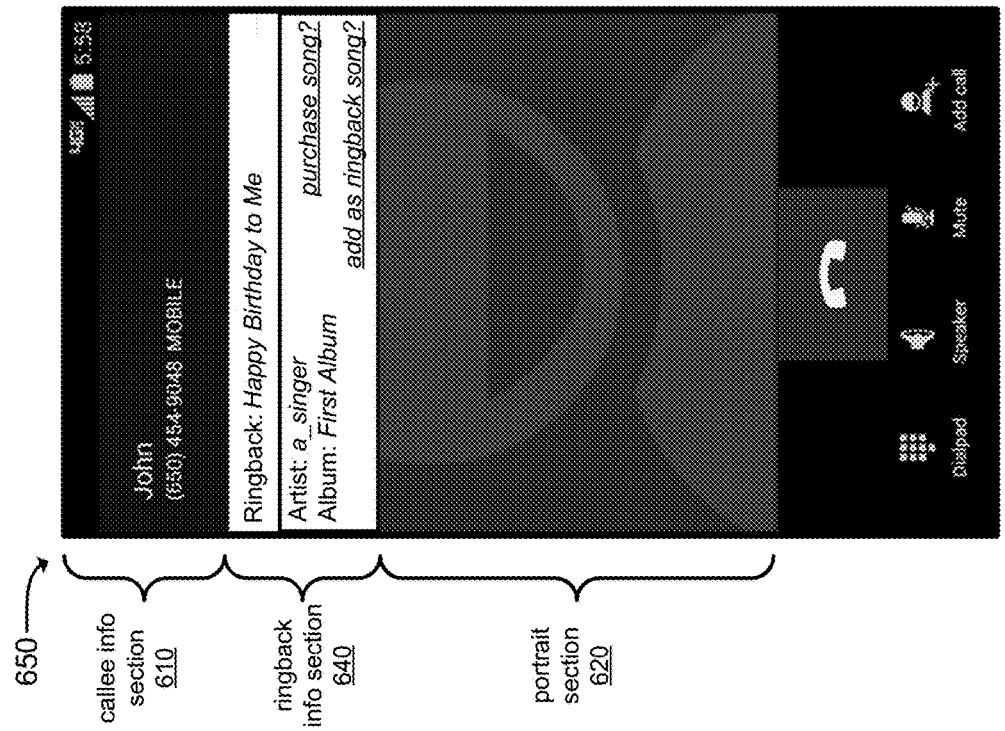
Figure 6A:
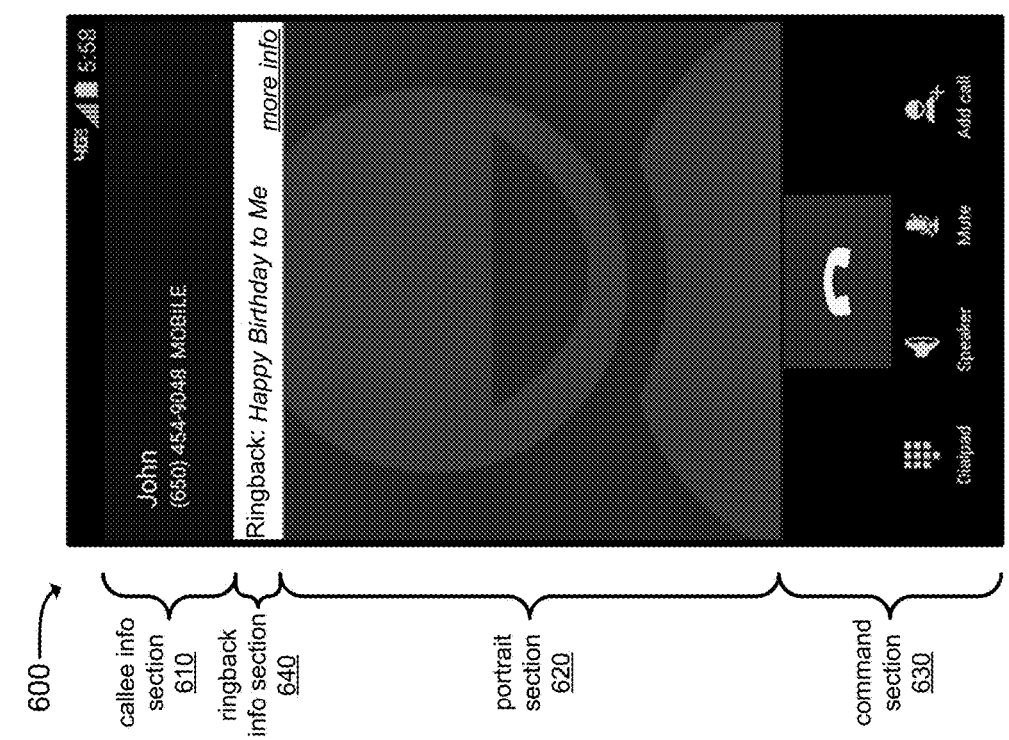

Call interface 600, illustrated in FIG. 6A, may be displayed to a caller during a telephone call, such as during the ringback portion of a telephone call. Call interface 600 may include, for example: callee information section 610, which may include information about the callee (e.g., "John," associated with telephone number "650 454-9048 MOBILE"); portrait section 620, which may include a picture associated with the callee; and command section 630, which may include graphical elements (e.g., graphical buttons, links, widgets, etc.) through which the caller can enter commands related to the call. Command section 630 may include, for instance, a button to initiate interaction with a dialpad of mobile device 210, a button to control whether the telephone call is in "speaker" mode, a button to mute audible input of the caller, a button to add the callee to a contact list or social network list, and a button to hang up the call.

Consistent with aspects herein, call interface 600 may also include ringback information section 640. Ringback information section 640, as illustrated, may include a relatively small area of call interface 600 that may display information about the current custom ringback audio. Ringback information section 640 may only be visible when the caller calls a telephone number and receives custom ringback audio. At other times, such as when the ringback audio is a standard ringback tone, ringback information section 640 may not be displayed (e.g., callee information section 610 and/or portrait section 620 may fill the space illustrated for ringback information section 640). In this example, in which the ringback audio is the song "Happy Birthday to Me," ringback information section 640 displays the title of the song. Ringback information section 640 also displays a button (illustrated as the link "more info"), that when selected, may provide more information about the song.

Call interface 650, illustrated in FIG. 6B, may be a version of call interface 600 after the caller has selected the "more info" button. As illustrated, in response to selection of the "more info" button, additional information, relating to the custom ringback audio may be displayed. For example, ringback information section 640 may be expanded to display additional information relating to the song "Happy Birthday to Me" (e.g., additional information from the metadata received by the caller). As shown, the additional information may include the artist/singer correspond to the song ("a_singer") and the album corresponding to the song ("First Album"). Additionally, in this example, a button (illustrated as the link "purchase song?") may be provided to allow the caller to initiate purchasing of the song. Selection of the "purchase song?" link may cause the song to be added to the caller's music collection (and the caller's account potentially charged), added to a playlist associated with the caller, or in some other way made available to the caller for listening to the song. Similarly, in this example, a button (illustrated as the link "add as ringback song?") may be provided to allow the caller to cause the song to be set as the ringback song for the caller.

In the example of FIG. 6B, certain options, such as relating to allowing the caller to purchase a song or purchase ringback audio, may only be displayed to the caller if the option applies to the caller. For example, some songs may not be available for purchase. In this case, the metadata generated by ringback server 240 may not include metadata that indicates that the song is available for the caller. Thus, the option to purchase the song may not be shown to the caller in call interface 650. Similarly, a particular telecommunications provider may only have rights to use certain content as ringback audio. If a particular song is not available to the telecommunications provider associated with the caller, the option to add the song as a ringback song may be omitted.

Call interface 700, illustrated in FIG. 7, may be displayed to a caller during a telephone call, such as during the ringback portion of a telephone call. Call interface 700 may be similar to call interface 600. In the example of FIG. 7, however, ringback information section 640 may include a command button (illustrated as the link "get memorabilia"), that when selected, may cause a webpage or other interface to launch that provides a shopping interface for purchasing memorabilia or other merchandise associated with the artist and/or song. The memorabilia may include, for example, artist tee-shirts, hats, posters, etc.

Call interface 800, illustrated in FIG. 8, may be displayed to a caller during a telephone call, such as during the ringback portion of a telephone call. Call interface 800 may be similar to call interface 600. In the example of FIG. 8, however, ringback information section 640 may include a button (illustrated as the link "see Artist memorabilia when call finishes"), that when selected, may cause a webpage or other interface to launch, at the completion of the call, that provides a shopping interface for purchasing memorabilia or other merchandise associated with the artist and/or song. In this example, call interface application 215 may thus wait until the call is over before providing the shopping interface, which may advantageously allow the user to finish the call using the normal user interface. Although the display of a delayed shopping interface is illustrated in FIG. 8, more generally, call interface application 215 may provide other interfaces at the conclusion of the call, such as a music purchase interface, a web page providing additional information about the artist/song, an interface for purchasing concert tickets for the artist, etc.

Figure 9:
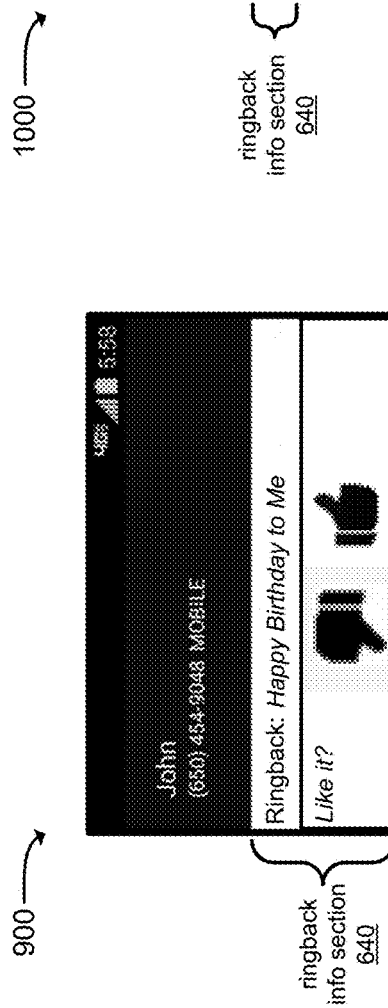

Call interface 900, illustrated in FIG. 9, may be displayed to a caller during a telephone call, such as during the ringback portion of a telephone call. Call interface 900 may be similar to call interface 600. In the example of FIG. 9, however, ringback information section 640 may include options through which the caller may rate or otherwise provide feedback on the custom ringback audio. For example, the user may submit comments, indicate whether the caller enjoys the ringback audio, etc. In some implementations, the caller feedback may be transmitted, by call interface application 215, to ringback server 245 or to another device. The feedback information may be provided to the callee, such as by providing an indication, to the callee, of the portion of callers that provided positive/negative feedback relating to the ringback audio. In the particular example of FIG. 9, thumbs up (positive feedback) and thumbs down (negative feedback) icons are illustrated. The caller may select one of the icons to indicate whether the caller likes or dislikes the ringback audio.

Figure 10:
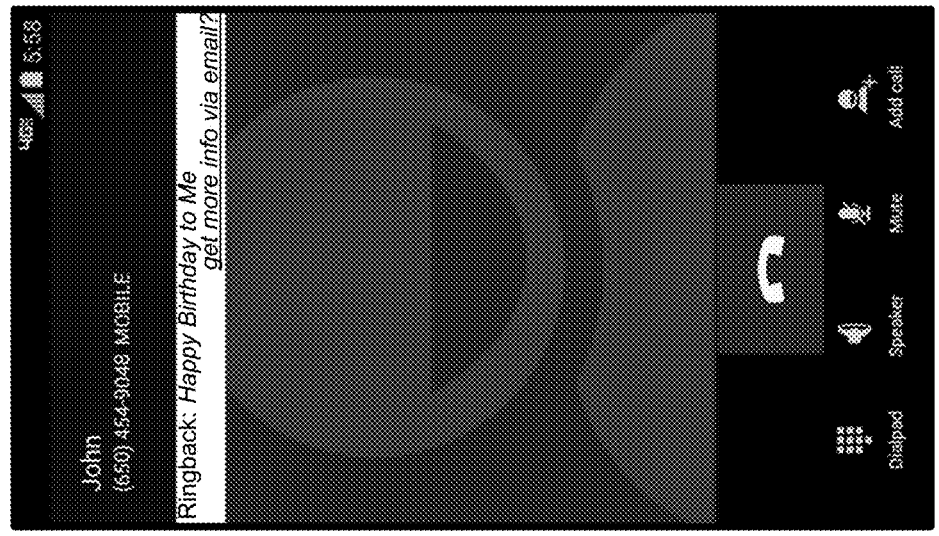

Call interface 1000, illustrated in FIG. 10, may be displayed to a caller during a telephone call, such as during the ringback portion of a telephone call. Call interface 1000 may be similar to call interface 600. In the example of FIG. 10, however, ringback information section 640 may include an option receive additional information via an alternative communication channel. For example, as illustrated, the caller may be provided with an option to receive additionally information, relating to the ringback audio, via email (illustrated as the link "get more info via email?"), a text message, or an instant message. By selecting the link, an email may be sent to the caller including additional information about the song, such as the title of the song, the artist associated with the song, biographical information about the artist, etc. In alternative implementations, the additional information may be provided using other communication techniques, such as via a text message, a post to a social network, etc.

Figure 11:
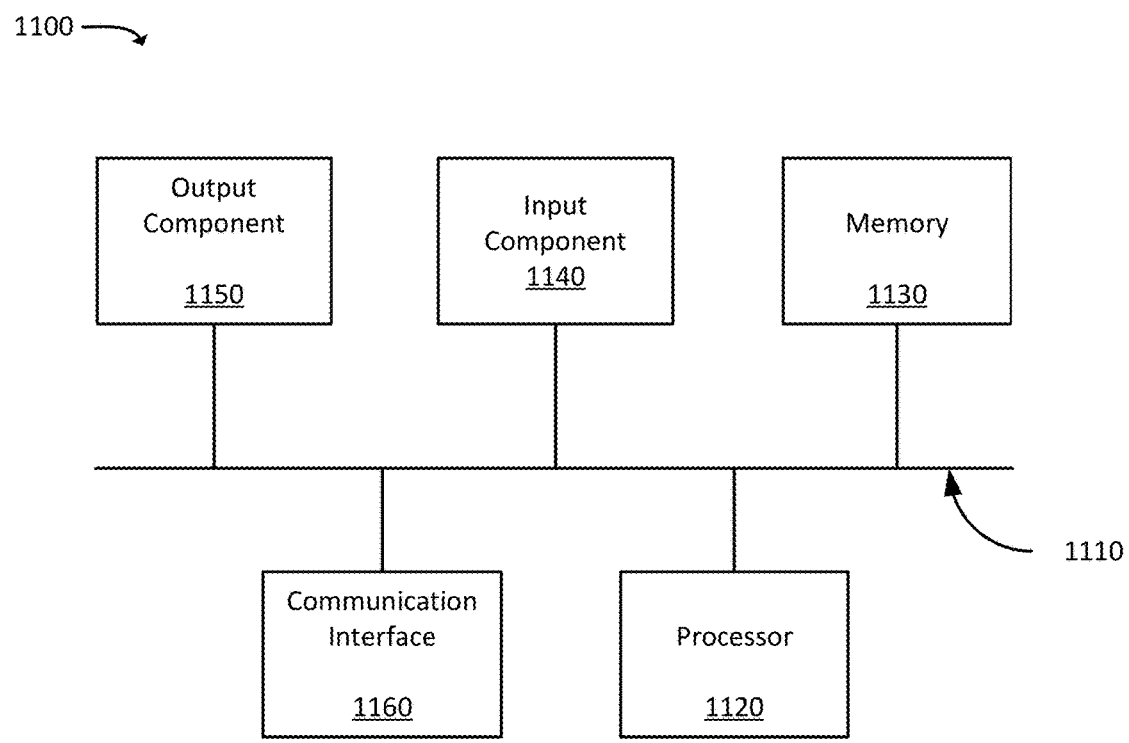
FIG. 11 is a diagram of example components of device.

FIG. 11 is a diagram of example components of device 1100. One or more of the devices described above (e.g., with respect to FIGS. 1 and/or 2) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may include processing circuitry to interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   initiating a call, by a caller device, to a callee;
   receiving, by the caller device, ringback audio associated with the callee, the ringback audio including a musical piece or a portion of the musical piece;
   receiving, by the caller device, metadata relating to the ringback audio, the metadata including information relating to a description of the ringback audio;
   playing, by the caller device, the received ringback audio during a ringback portion of the call;
   providing, by the caller device and via a graphical interface of the caller device, a graphical ringback information section, included within a call interface provided by the caller device, used to display at least a portion of the metadata relating to the ringback audio, the call interface including a graphical interface that is provided to enable interaction, during the call, of a user of the caller device with functions relating to the call;
   receiving selection of a graphical element, during the call and from within the ringback information section of the call interface, relating to the providing of additional information about the musical piece, the additional information being provided via an alternative communication channel after a conclusion of the call; and
   providing, after conclusion of the call and based on selection of the graphical element, and in response to the conclusion of the call and via the alternative communication channel, the additional information relating to the musical piece.

2. The method of claim 1, further including:
   ceasing to provide the ringback information section, as part of the call interface, at a conclusion of the ringback portion of the call.

3. The method of claim 1, wherein the metadata further includes information relating to:
   a title associated with the musical piece;
   an artist associated with the musical piece;
   an album associated with the musical piece;
   purchasing of the musical piece; or
   purchasing tickets for live performances by the artist associated with the musical piece.

4. The method of claim 1, wherein the call interface further includes:
   a graphical button to expand the ringback information section, the expanded ringback information section displaying the additional information about the musical piece during the ringback portion of the call.

5. The method of claim 1, wherein the call interface further includes:
   a second graphical element that, when selected, provides a shopping interface relating to the purchase of memorabilia associated with an artist associated with the musical piece.

6. The method of claim 1, wherein the call interface further includes:
   one or more graphical icons through which the caller inputs feedback relating to whether the caller likes or dislikes the musical piece.

7. The method of claim 1, wherein the call interface additionally includes:
   a graphical section relating to viewing a dialpad for the call;
   a graphical section relating to a speaker mode option for the call; and
   a graphical section relating to muting the call.

8. A mobile device including processing circuitry to:
   place a call to a callee;
   receive ringback audio associated with the callee, the ringback audio including a musical piece or a portion of the musical piece;
   receive metadata relating to the ringback audio, the metadata including information relating to a description of the ringback audio and including at least a title of the musical piece;
   play the received ringback audio during a ringback portion of the call;
   provide, via a graphical interface of the mobile device, a graphical ringback information section, included within a call interface provided by the mobile device, used to display information about the musical piece, the ringback information section displaying at least the title of the musical piece, the call interface including a graphical interface that is provided to enable interaction, during the call, of a user of the caller device with functions relating to the call;
   receive selection of a graphical element, during the call and from within the ringback information section of the call interface, relating to the providing of additional information about the musical piece, the additional information being provided via an alternative communication channel after a conclusion of the call; and
   provide, after conclusion of the call and based on selection of the graphical element and in response to the conclusion of the call and via the alternative communication channel, the additional information relating to the musical piece.

9. The mobile device of claim 8, wherein the processing circuitry is further to:
   cease to provide the ringback information section, as part of the call interface, at a conclusion of the ringback portion of the call.

10. The mobile device of claim 8, wherein the metadata further includes information relating to:
    an artist associated with the musical piece;
    an album associated with musical piece;
    purchasing of the musical piece; or
    purchasing tickets for live performances by the artist associated with the musical piece.

11. The mobile device of claim 8, wherein the call interface further includes:
    a graphical button to expand the ringback information section, the expanded ringback information section displaying the additional information about the musical piece during the ringback portion of the call.

12. The mobile device of claim 8, wherein the call interface further includes:
    a second graphical element that, when selected, provides a shopping interface relating to the purchase of memorabilia associated with an artist associated with the musical piece.

13. A non-transitory computer readable medium containing program instructions for causing one or more processors to:
    initiate a call, by a caller device, to a callee;
    receive, by the caller device, ringback audio associated with the callee, the ringback audio including a musical piece or a portion of the musical piece;

receive, by the caller device, metadata relating to the ringback audio, the metadata including information relating to a description of the ringback audio;

play, by the caller device, the received ringback audio during a ringback portion of the call;

provide, by the caller device and via a graphical interface of the caller device, a graphical ringback information section, included within a call interface provided by the caller device, used to display at least a portion of the metadata relating to the ringback audio, the call interface including a graphical interface that is provided to enable interaction, during the call, of a user of the caller device with functions relating to the call;

receive selection of a graphical element, during the call and from within the ringback information section of the call interface, relating to the providing of additional information about the musical piece, the additional information being provided via an alternative communication channel after a conclusion of the call; and provide, after conclusion of the call and based on selection of the graphical element and in response to the conclusion of the call and via the alternative communication channel, the additional information relating to the musical piece.

14. The non-transitory computer readable medium of claim 13, further include program instructions for causing the one or more processors to:

cease to provide the ringback information section, as part of the call interface, at a conclusion of the ringback portion of the call.

15. The non-transitory computer readable medium of claim 13, wherein the metadata further includes information relating to:

a title associated with the musical piece;

an artist associated with the musical piece;

an album associated with musical piece;

purchasing of the musical piece; or purchasing tickets for live performances by the artist associated with the musical piece.

16. The non-transitory computer readable medium of claim 13, wherein the call interface further includes:

a graphical button to expand the ringback information section, the expanded ringback information section displaying the additional information about the musical piece during the ringback portion of the call.

17. The non-transitory computer readable medium of claim 13, wherein the call interface further includes:

a second graphical element that, when selected, provides a shopping interface relating to the purchase of memorabilia associated with an artist associated with the musical piece.

* * * * *